(12) United States Patent
Yokomichi et al.

(10) Patent No.: US 11,104,829 B2
(45) Date of Patent: Aug. 31, 2021

(54) ADHESIVE COMPOSITION AND HOT-MELT ADHESIVE

(71) Applicant: TOYOBO CO., LTD., Osaka (JP)

(72) Inventors: Takuya Yokomichi, Hyogo (JP); Kenji Kashihara, Hyogo (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 15/770,617

(22) PCT Filed: Aug. 26, 2016

(86) PCT No.: PCT/JP2016/074946
§ 371 (c)(1),
(2) Date: Apr. 24, 2018

(87) PCT Pub. No.: WO2017/073153
PCT Pub. Date: May 4, 2017

(65) Prior Publication Data
US 2018/0305592 A1  Oct. 25, 2018

(30) Foreign Application Priority Data
Oct. 26, 2015  (JP) .............................. JP2015-209678

(51) Int. Cl.
| C09J 123/12 | (2006.01) |
| C09J 7/35 | (2018.01) |
| C09J 123/04 | (2006.01) |
| B32B 27/32 | (2006.01) |
| B32B 27/00 | (2006.01) |
| C09J 123/14 | (2006.01) |
| C09J 123/26 | (2006.01) |
| C09J 7/29 | (2018.01) |

(52) U.S. Cl.
CPC ............. *C09J 123/12* (2013.01); *B32B 27/00* (2013.01); *B32B 27/32* (2013.01); *C09J 7/29* (2018.01); *C09J 7/35* (2018.01); *C09J 123/04* (2013.01); *C09J 123/14* (2013.01); *C09J 123/26* (2013.01); *C08L 2205/03* (2013.01)

(58) Field of Classification Search
CPC . B32B 27/00; B32B 27/32; B32B 7/12; C09J 123/12; C09J 123/04; C09J 123/26; C09J 7/35; C09J 7/29; C09J 123/14; C09J 123/10; C09J 2301/304; C08L 51/06; C08L 23/04; C08L 2205/03
See application file for complete search history.

(56) References Cited

U.S. PATENT DOCUMENTS

| 3,987,122 A | * | 10/1976 | Bartz et al. | ........... C08F 291/00 525/193 |
| 4,120,916 A | * | 10/1978 | Meyer, Jr. | .............. C09J 123/02 525/240 |
| 4,774,144 A | * | 9/1988 | Jachec et al. | ........ C09J 123/142 428/461 |
| 6,124,401 A | * | 9/2000 | Hart, Jr. et al. | ........ C03C 17/32 525/108 |
| 7,429,634 B2 | * | 9/2008 | Brant et al. | ............. C08F 10/00 526/113 |
| 8,197,947 B2 | * | 6/2012 | Botros | .................... B32B 27/38 428/523 |
| 8,563,138 B2 | * | 10/2013 | Yasui et al. | ............... B32B 7/12 428/516 |
| 2002/0085985 A1 | * | 7/2002 | Mattai et al. | ........ A61K 8/0229 424/65 |
| 2009/0117330 A1 | * | 5/2009 | Shiina et al. | ......... B29C 59/046 428/151 |
| 2009/0291284 A1 | * | 11/2009 | Frauenhofer et al. | .. B32B 27/32 428/220 |
| 2013/0296476 A1 | | 11/2013 | Yasui et al. | |
| 2015/0037596 A1 | | 2/2015 | Takamori et al. | |
| 2015/0183980 A1 | * | 7/2015 | Zheng | ..................... C08L 23/06 525/70 |
| 2015/0247069 A1 | | 9/2015 | Schauder et al. | |
| 2015/0367601 A1 | * | 12/2015 | Ando et al. | ............ B65D 65/14 429/176 |
| 2015/0367605 A1 | * | 12/2015 | Morikawa et al. | ... B32B 15/085 428/461 |
| 2016/0305578 A1 | * | 10/2016 | Tappe | ..................... B32B 5/028 |

FOREIGN PATENT DOCUMENTS

| JP | 10-46121 | 2/1998 |
| JP | 2001-98121 | 4/2001 |
| JP | 3232317 | 11/2001 |
| JP | 2004-269688 | 9/2004 |
| JP | 2013-231113 | 11/2013 |

(Continued)

OTHER PUBLICATIONS

Chapter 5—Characteristics of Adhesive Materials ScienceDirect, Adhesives Technology Handbook (Second Edition)) 2009, pp. 63-135. (Year: 2009).*

Crystallization Behavior of Propylene-Butene Copolymers: The Trigonal Form of Isotactic Polypropylene and Form I of Isotactic Poly (1-butene) by Claudio De Rosa et al., Macromolecules 2011,44, 540-549, 2011.*

International Search Report dated Oct. 11, 2016 in International (PCT) Application No. PCT/JP2016/074946.

(Continued)

*Primary Examiner* — Irina S Zemel

(74) *Attorney, Agent, or Firm* — Wenderoth, Lind & Ponack, L.L.P.

(57) ABSTRACT

The present invention provides an adhesive composition and a hot-melt adhesive that are suitably used for bonding a polyolefin resin substrate and a polar material, and that are capable of low-temperature adhesion. The adhesive composition comprises an acid-modified polypropylene (A), an unfunctionalized polypropylene (B), and a polyethylene (C), and has a melting point of 70 to 140° C.

6 Claims, No Drawings

(56) References Cited

FOREIGN PATENT DOCUMENTS

| WO | 2012/099107 | 7/2012 |
| WO | 2014/046834 | 3/2014 |

OTHER PUBLICATIONS

Extended European Search Report dated Mar. 7, 2019 in corresponding European Application No. 16859390.3.

* cited by examiner

ADHESIVE COMPOSITION AND HOT-MELT ADHESIVE

TECHNICAL FIELD

The present invention relates to an adhesive composition that uses polyolefin-based resins, in particular, a hot-melt adhesive suitable for bonding a polyolefin resin substrate and a polar material.

BACKGROUND ART

Polyolefin materials, such as polypropylene and polyethylene, which are readily available and have excellent forming processability, are used in various industrial fields.

However, polyolefin materials have extremely insufficient adhesion since polyolefins, which do not contain a polar group in the molecule, are chemically inert. Although organic solvent-based adhesives are usually used for bonding, the regulations on the use of organic solvents have been becoming stricter these days, and various approaches have been considered to perform bonding without using an organic solvent. Hot-melt adhesives, which are easily operable and easily handled, have been widely used as one method for solvent-free bonding.

As a polyolefin resin for use as an adhesive component, an acid-modified polyolefin resin composition has been proposed in which an ethylene-vinyl alcohol copolymer resin is mixed with an acid-modified polyolefin resin (Patent Literature 1 (PTL 1)).

A method in which a tackifier is mixed with an α-olefin copolymer has also been proposed as a method that enables low-temperature bonding, which causes no damage to polyolefin resin substrates (PTL 2).

CITATION LIST

Patent Literature

PTL 1: Japanese Patent No. 3232317B
PTL 2: JPH10-046121A

SUMMARY OF INVENTION

Technical Problem

In terms of the method disclosed in PTL 1, however, the melting point of the acid-modified polyolefin resin composition is not taken into consideration. If the melting point of the acid-modified polyolefin resin composition is close to the melting point of a substrate (adherend), the substrate may possibly undesirably be damaged in heat-welding; thus, the method for use is limited. The method disclosed in PTL 2 suffers from a problem such that the tackifier undesirably bleeds out, and that an overly low melting point makes solidification difficult when kneading is performed using an extruder.

The present invention has been completed in view of the above viewpoints. An object of the present invention is to provide a hot-melt adhesive that does not contain a tackifier but contains a specific acid-modified polypropylene, unfunctionalized polypropylene, and polyethylene. The hot-melt adhesive that contains these components is suitably used for bonding a polyolefin substrate and a polar material. Further, the hot-melt adhesive is adjusted to have a melting point within a predetermined range, enabling low-temperature adhesion (140° C. or lower) to be performed.

Solution to Problem

To achieve the above objects, the present inventors conducted extensive research to propose the following inventions. More specifically, the present invention encompasses the following adhesive composition that uses polyolefin-based resins, as well as a hot-melt adhesive that uses this adhesive composition.

An adhesive composition comprising an acid-modified polypropylene (A), an unfunctionalized polypropylene (B), and a polyethylene (C), and having a melting point of 70 to 140° C.

The adhesive composition preferably comprises the unfunctionalized polypropylene (B) in an amount of 140 to 1500 parts by mass, and the polyethylene (C) in an amount of 10 to 600 parts by mass, per 100 parts by mass of the acid-modified polypropylene (A).

A hot-melt adhesive comprising the adhesive composition, and a laminate of a polyolefin resin substrate and a polar material bonded with the hot-melt adhesive.

Advantageous Effects of Invention

The adhesive composition of the present invention comprises an acid-modified polypropylene, an unfunctionalized polypropylene, and polyethylene, and has a melting point of 70 to 140° C. Therefore, low-temperature bonding at a temperature of 140° C. or lower is possible in the heat-welding of a low-melting-point substrate, such as a polyolefin resin substrate, without damaging the polyolefin resin substrate. Further, the adhesive composition of the present invention has high adhesion to a polyolefin resin substrate.

DESCRIPTION OF EMBODIMENTS

The following are detailed embodiments according to the present invention.

Acid-Modified Polypropylene (A)

The acid-modified polypropylene (A) used in the present invention is not limited, and is obtained by grafting (or acid-modifying) at least one of homopolypropylene and a propylene-α-olefin copolymer with at least one of α,β-unsaturated carboxylic acid and acid anhydride thereof.

The propylene-α-olefin copolymer mainly comprises propylene that is copolymerized with an α-olefin. Examples of α-olefins include ethylene, 1-butene, 1-heptene, 1-octene, 4-methyl-1-pentene, vinyl acetate, and the like, which can be used singly or in a combination of two or more. Preferred among these α-olefins are ethylene and 1-butene. The ratio of the propylene component to the α-olefin component in the propylene-α-olefin copolymer is not limited; the propylene component is preferably 50 mol % or higher, and more preferably 70 mol % or higher.

Examples of at least one of α,β-unsaturated carboxylic acid and acid anhydride thereof include maleic acid, itaconic acid, citraconic acid, and acid anhydrides thereof. Among these, acid anhydrides are preferred, and a maleic acid anhydride is more preferred. Specific examples include maleic acid anhydride-modified polypropylene, maleic acid anhydride-modified propylene-ethylene copolymers, maleic acid anhydride-modified propylene-butene copolymers, maleic acid anhydride-modified propylene-ethylene-butene copolymers, and the like. These acid-modified polyolefins can be used singly or in a combination of two or more.

The acid value (mg KOH/g-resin) of the acid-modified polypropylene (A) is preferably 3 mg KOH/g-resin or more, more preferably 6 mg KOH/g-resin or more, and even more preferably 9 mg KOH/g-resin or more, from the viewpoint of adhesion to a polar material and a polyolefin resin substrate. If the acid value is less than 3 mg KOH/g-resin, the adhesion to a polar material may be impaired. The acid value (mg KOH/g-resin) is preferably 50 mg KOH/g-resin or less, and more preferably 30 mg KOH/g-resin or less. If the acid value exceeds 50 mg KOH/g-resin, the adhesion to a polyolefin resin substrate may be reduced.

The melting point of the acid-modified polypropylene (A) is preferably 65° C. or higher, more preferably 80° C. or higher, and still more preferably 90° C. or higher. If the melting point is less than the above value, granulation may become difficult. The melting point is preferably 140° C. or lower, and more preferably 130° C. or lower. If the value exceeds the above value, low-temperature heat-sealing properties may be impaired. To obtain the acid-modified polypropylene (A) having a melting point within the above range, it is preferable to use a low-melting-point unfunctionalized polypropylene as a starting material. The melting point of the unfunctionalized polypropylene is preferably 70° C. or higher, and more preferably 95° C. or higher, and is preferably 145° C. or lower, and more preferably 135° C. or lower.

The melting point of the acid-modified polypropylene (A) is preferably 5 to 10° C. lower than that of the unfunctionalized polypropylene (B) mentioned later.

The melt viscosity of the acid-modified polypropylene (A) at 230° C. is preferably 1000 mPa·s or more, and more preferably 2000 mPa·s or more. If the melt viscosity is less than the above value, granulation may become difficult. Further, the melt viscosity is preferably 20000 mPa·s or less, and more preferably 10000 mPa·s or less. If the melt viscosity exceeds the above value, the open time may be reduced, and the workability may deteriorate.

The acid-modified polypropylene (A) is preferably in a crystalline form. The crystalline form is advantageous because higher cohesive power, as well as superior adhesion and chemical resistance are achieved, as compared with the amorphous form. As used herein, when a substance is in a crystalline fora, the substance shows a clear melting peak in the process of temperature increase at 20° C./min from −100° C. to 250° C. measured by a differential scanning calorimeter (DSC).

The method for producing the acid-modified polypropylene (A) is not particularly limited. Examples of the method include a radical grafting reaction in which a radical species is formed in a polymer serving as a main chain, and unsaturated carboxylic acid and acid anhydride are graft-polymerized using the radical species as a polymerization starting point.

Although the radical generator is not particularly limited, an organic peroxide is preferably used. Examples of organic peroxides include peroxides, such as di-tert-butylperoxy phthalate, tert-butyl hydroperoxide, dicumyl peroxide, benzoyl peroxide, tert-butylperoxy benzoate, tert-butyl peroxy-2-ethylhexanoate, tert-butyl peroxy pivalate, methyl ethyl ketone peroxide, di-tert-butyl peroxide, and lauroyl peroxide; azonitriles, such as azobisisobutyronitrile and azobisisopropionitrile; and the like.

Unfunctionalized Polypropylene (B)

The unfunctionalized polypropylene (B) used in the present invention is not limited, and is homopolypropylene or a propylene-α-olefin copolymer. The unfunctionalized polypropylene (B) is not acid-modified in the above manner; even if it is acid-modified, the acid value is less than 3 mg KOH/g-resin. The acid value is preferably 2 mg KOH/g-resin or less, more preferably 1 mg KOH/g-resin or less, and still more preferably 0.1 mg KOH/g-resin or less.

The propylene-α-olefin copolymer mainly comprises propylene that is copolymerized with an α-olefin. Examples of α-olefins include ethylene, 1-butene, 1-heptene, 1-octene, 4-methyl-1-pentene, vinyl acetate, and the like, which can be used singly or in a combination of two or more. Preferred among these α-olefins are ethylene and 1-butene. The ratio of the propylene component to the α-olefin component in the propylene-α-olefin copolymer is not limited; the propylene component is preferably 50 mol % or higher, and more preferably 70 mol % or higher.

The unfunctionalized polypropylene (B) is preferably not acid modified in the above manner, and a polar group, such as hydroxy, carboxyl, and epoxy, is not grafted. Here, the term "not grafted" means that that the graft amount is less than 0.3 mass %, preferably 0.2 mass % or less, more preferably 0.1 mass % or less, and still more preferably 0.01 mass % or less.

The melting point of the unfunctionalized polypropylene (B) is preferably 70° C. or higher, and more preferably 95° C. or higher. If the melting point is less than the above values, granulation may become difficult. Further, the melting point is preferably 145° C. or lower, and more preferably 135° C. or lower. If the value exceeds the above values, low-temperature heat-sealing properties may be impaired.

The melt flow rate (MFR) of the unfunctionalized polypropylene (B) at 230° C. is preferably 1 g/10 minutes or more, and more preferably 2 g/10 minutes or more. If the melt flow rate is less than the above values, the open time may be reduced. Further, the melt flow rate is preferably 1000 g/10 minutes or less, and more preferably 500 g/10 minutes or less. If the value exceeds the above values, granulation may become difficult.

The amount of the unfunctionalized polypropylene (B) is preferably 140 parts by mass or more, more preferably 160 parts by mass or more, and still more preferably 180 parts by mass or more, per 100 parts by mass of the acid-modified polypropylene (A). If the amount is less than the above values, the adhesion to a polyolefin resin substrate may be reduced. The amount is preferably 1500 parts by mass or less, more preferably 1000 parts by mass or less, and still more preferably 800 parts by mass or less. An amount exceeding the above values is not preferable since the adhesion to a polar material may be reduced.

Polyethylene (C)

The types of the polyethylene (C) used in the present invention are not limited. Examples include high-density polyethylenes, low-density polyethylenes, and the like. Preferred are low-density polyethylenes, which allow the melting point of the adhesive composition to be easily controlled.

The polyethylene (C) is preferably, but not limited to, homopolyethylene or an ethylene-α-olefin copolymer. Examples of α-olefins include propylene, 1-butene, 1-heptene, 1-octene, 4-methyl-1-pentene, vinyl acetate, and the like, which can be used singly or in a combination of two or more. Preferred among these α-olefins are propylene and 1-butene. The ratio of the ethylene component to the α-olefin component in the ethylene-α-olefin copolymer is not limited; the ethylene component is preferably 50 mol % or higher, and more preferably 70 mol % or higher.

The polyethylene (C) is not acid-modified in the above manner; even if it is acid-modified, the acid value is preferably less than 3 mg KOH/g-resin. The acid value is preferably 2 mg KOH/g-resin or less, more preferably 1 mg KOH/g-resin or less, and still more preferably 0.1 mg KOH/g-resin or less.

The density of the polyethylene (C) is preferably, but not particularly limited to, 0.910 g/cm$^3$ or more and less than 0.930 g/cm$^3$.

The melting point of the polyethylene (C) is preferably 90° C. or higher, and more preferably 95° C. or higher. If the melting point of the polyethylene (C) is less than 90° C., granulation may become difficult, which is not preferable in terms of productivity. Further, the melting point is preferably 130° C. or lower, and more preferably 120° C. or lower. If the melting point exceeds 130° C., low-temperature adhesion properties may be impaired.

The polyethylene (C) is preferably not acid-modified. Even if it is acid-modified, the acid value is preferably 1 mg KOH/g-resin or less, and more preferably 0.1 mg KOH/g-resin or less.

The melt flow rate (MFR) of the polyethylene (C) at 190° C. is preferably 0.1 g/10 minutes or more, and more preferably 0.2 g/10 minutes or more. If the melt flow rate is less than the above values, the open time may be reduced, deteriorating the workability. Further, the melt flow rate is preferably 100 g/10 minutes or less, and more preferably 50 g/10 minutes or less. If the value exceeds the above values, granulation may become difficult.

The amount of the polyethylene (C) is preferably 10 parts by mass or more, more preferably 15 parts by mass or more, and still more preferably 20 parts by mass or more, per 100 parts by mass of the acid-modified polypropylene (A). If the amount is less than the above values, granulation may become difficult, which is not preferable in terms of productivity. Further, the amount is preferably 600 parts by mass or less, more preferably 400 parts by mass or less, and still more preferably 200 parts by mass or less. An amount exceeding the above values is not preferable since the adhesion to a polar material may be reduced.

Adhesive Composition

The adhesive composition of the present invention comprises the acid-modified polypropylene (A), the unfunctionalized polypropylene (B), and the polyethylene (C), and has a melting point of 70 to 140° C.

The use of the acid-modified polypropylene (A), the unfunctionalized polypropylene (B), and the polyethylene (C) in the predetermined amounts stated above makes it possible to obtain a composition having a melting point of 70 to 140° C.

The adhesive composition of the present invention preferably has a melting point of 75° C. or higher, more preferably 80° C. or higher, and still more preferably 90° C. or higher. If the melting point of the adhesive composition is less than 70° C., granulation may become difficult, which is not preferable in terms of productivity. Further, the melting point is preferably 135° C. or lower, more preferably 130° C. or lower, and still more preferably 120° C. or lower. If the melting point exceeds 140° C., low-temperature adhesion properties will be impaired.

Although not limiting the present invention, in the present invention, a uniform adhesive composition is obtained by melt-kneading the acid-modified polypropylene (A), the unfunctionalized polypropylene (C), and the polyethylene (C). Melt-kneading may be performed by using a general-purpose melt-kneading machine for plastics. For example, a single- or twin-screw kneading extruder, a hot melt-stirring tank, and the like, may be used.

A tackifier is preferably not substantially contained in the adhesive composition of the present invention. The meaning of the phrase "a tackifier is not substantially contained" is such that the tackifier is preferably present in an amount of 1 mass % or less, more preferably 0.1 mass % or less, and still more preferably 0 mass %, in the adhesive composition. Since a tackifier is not substantially contained, bleeding out will not occur, making it possible to obtain an easily solidified adhesive composition that has high productivity. Examples of tackifiers include terpene-based resins, rosin-based resins, and petroleum-based resins.

Hot-Melt Adhesive

The hot-melt adhesive of the present invention comprises the adhesive composition above and does not comprise an organic solvent. The adhesive composition is preferably contained in an amount of 90 mass % or more, more preferably 95 mass % or more, and still more preferably 100 mass %, in the hot-melt adhesive. If the amount of the adhesive composition is overly small, adhesion to a polyolefin resin substrate or a polar material may be reduced.

The hot-melt adhesive of the present invention may contain various additives as long as the performance of the present invention is not impaired. Although the additives are not particularly limited, a flame retardant, pigment, anti-blocking agent, etc., are preferably used.

Polyolefin Resin Substrate

A polyolefin resin substrate can be suitably selected from known polyolefin resins. Examples include, but are not limited to, polyethylene, polypropylene, ethylene-propylene copolymers, and the like. It is particularly preferable to use a polypropylene sheet (hereinafter sometimes referred to as "PP"). The thickness is preferably, but not particularly limited to, 0.1 to 5 mm, more preferably 0.5 to 3 mm, and still more preferably 1 to 2 mm. The polyolefin resin substrate may contain pigments and various additives, as necessary.

Polar Material

The polar material used in the present invention is not particularly limited. Examples include metal substrates, polar resin substrates, and the like, with metal substrates being preferable.

Examples of metal substrates include, but are not particularly limited to, various metals, such as aluminum, copper, steel, SUS, magnesium, zinc, duralumin, and alloys thereof. The metal substrate can have any shape, such as a metal sheet, a rolled plate, a panel, a pipe, a can, or a cap. In general, an aluminum sheet is preferred, in terms of processability etc. The metal substrate is generally used in the form of a sheet having a thickness of 0.01 to 10 mm, and preferably 0.02 to 5 mm, although it varies depending on the purpose of use. The surface of such a metal substrate may be subjected to surface treatment beforehand, or may be untreated.

Examples of polar resin substrates include, but are not particularly limited to, high polar plastic-based materials, such as nylon, ethylene-vinyl alcohol copolymer resins (EVOH), and polyethylene terephthalate (PET). The polar resin substrate can have any shape. The polar resin substrate is generally used in the form of a sheet having a thickness of 0.01 to 10 mm, and preferably 0.02 to 5 mm, although it varies depending on the purpose of use. The surface of such a polar resin substrate may be subjected to surface treatment beforehand, or may be untreated. The same effect can be exhibited in both cases.

Laminate

The laminate of the present invention is obtained by laminating a polar material and a polyolefin resin substrate with the hot-melt adhesive of the present invention (polar material/adhesive layer/polyolefin resin substrate).

The lamination may be performed using known laminate production technology. Although not limiting the present invention, for example, the hot-melt adhesive may be applied to the surface of the polar material using a suitable coating means, such as a roll coater or bar coater. Then, the polyolefin resin substrate may be laminated and bonded to the coating surface while the adhesive layer formed on the surface of the polar material is in a molten state to thus obtain a laminate. The temperature of thermo-compression bonding is preferably, but not particularly limited to, 130° C. or higher, and more preferably 140° C. or higher, and is preferably 160° C. or lower, and more preferably 150° C. or lower. The pressure of thermo-compression bonding is preferably, but not particularly limited to, 0.09 MPa or more, and more preferably 0.1 MPa or more, and is preferably 0.12 MPa or less, and more preferably 0.11 MPa or less.

The thickness of the adhesive layer formed from the hot-melt adhesive is preferably, but not particularly limited to, 10 to 100 μm, more preferably 20 to 80 μm, and still more preferably 30 to 50 μm.

The present invention is described below in more detail with reference to Examples. However, the present invention is not limited to the Examples. The term "part" in the Examples and Comparative Examples indicates "part by mass."

Production Example 1

One hundred parts by mass of an unfunctionalized polypropylene having a melting point of 100° C. (unfunctionalized PO-B1, a propylene-butene copolymer ("Tafmer (registered trademark) XM7090," produced by Mitsui Chemicals, Inc.), 150 parts by mass of toluene, and 10 parts by mass of maleic acid anhydride were placed in a 1-L autoclave, and uniformly dissolved with heating to 130° C. At 130° C., 4 parts by mass of di-tert-butyl peroxide was added to the unfunctionalized PO-B1 solution, and the resulting mixture was heated to 140° C., followed by stirring for another 3 hours. After cooling the resulting reaction mixture, the reaction mixture was poured into a container containing a large amount of methyl ethyl ketone, and the resin was precipitated. Subsequently, the solution containing the resin was centrifuged to subject acid-modified polypropylene in which maleic acid anhydride was graft polymerized, (poly)maleic acid anhydride, and low-molecular-weight substances to solid-liquid separation and purification. After drying under reduced pressure at 70° C. for 5 hours, a maleic acid anhydride-modified polypropylene (acid-modified PO-A1, acid value: 11 mg KOH/g-resin, melting point: 95° C., melt viscosity 3000 mPa·s) was obtained.

Production Example 2

The same procedure as in Production Example 1 was performed, except that an unfunctionalized polypropylene having a melting point of 135° C. (PO-B2, "Wintec (registered trademark) PP WFW4," produced by Japan Polypropylene Corporation) was used. Thereby, a maleic acid anhydride-modified polypropylene (acid-modified PO-A2, acid value: 15 mg KOH/g-resin, melting point: 130° C., melt viscosity: 3500 mPa·s) was obtained.

Production Example 3

The same procedure as in Production Example 1 was performed, except that an unfunctionalized polypropylene having a melting point of 160° C. (PO-B3, "J-105G," produced by Prime Polymer Co., Ltd.) was used. Thereby, a maleic acid anhydride-modified polypropylene (acid-modified PO-A3, acid value: 8 mg KOH/g-resin, melting point: 155° C., melt viscosity: 4000 mPa·s) was obtained.

Production Example 4

The same procedure as in Production Example 1 was performed, except that an unfunctionalized polypropylene having a melting point of 75° C. (PO-B4, "Tafmer (registered trademark) XM7070," produced by Mitsui Chemicals, Inc.) was used. Thereby, a maleic acid anhydride-modified polypropylene (acid-modified PO-A4, acid value: 11 mg KOH/g-resin, melting point: 65° C., melt viscosity: 2500 mPa·s) was obtained.

Example 1

Ten parts by mass of the acid-modified PO-A1 as the acid-modified polypropylene (A), 75 parts by mass of the unfunctionalized PO-B1 as the unfunctionalized polypropylene (B), and 15 parts by mass of PE-1 as the polyethylene (C) were melt-kneaded at 160° C. using a 15-mm-diameter twin-screw extruder, followed by granulation to thus obtain a hot-melt adhesive.

Examples 2 to 11 and Comparative Examples 1 to 3

Examples 2 to 11 and Comparative Examples 1 to 3 were performed as in Example 1, using different types and amounts of the acid-modified polypropylene (A), the unfunctionalized polypropylene (B) and the polyethylene (C) as shown in Table 1. Table 1 shows the amount, adhesion, and granulation evaluation.

The following are the unfunctionalized polypropylenes (B) and polyethylene (C) used in the Examples and Comparative Examples.

Unfunctionalized Polypropylene (B)
Unfunctionalized PO-B1: a propylene-butene copolymer ("Tafmer (registered trademark) XM7090," produced by Mitsui Chemicals, Inc.), melting point: 100° C., MFR: 7 g/10 minutes Unfunctionalized PO-B2: a propylene-ethylene copolymer ("Wintec (registered trademark) WFW4," produced by Japan Polypropylene Corporation), melting point: 135° C., MFR: 7 g/10 minutes Unfunctionalized PO-B3: homopolypropylene ("J-105G," produced by Prime Polymer Co., Ltd.), melting point: 160° C., MFR: 9 g/10 minutes
Unfunctionalized PO-B4: a propylene-butene copolymer ("Tafmer (registered trademark) XM7070," produced by Mitsui Chemicals, Inc.), melting point: 75° C., MFR: 7 g/10 minutes Polyethylene (C)
PE-1: a low-density polyethylene ("Petrothene (registered trademark) 172," produced by Tosoh Corporation), melting point: 110° C., density: 0.920 g/cm$^3$, MFR: 0.30 g/10 minutes Measurement of Acid Value The acid value (mg KOH/g-resin) in the present invention is a value calculated by FT-IR (FT-IR8200PC, produced by Shimadzu Corporation) from the following formula using coefficient (f) obtained from a calibration curve prepared with a chloroform solution of maleic acid anhydride (Tokyo Chemical Industry Co., Ltd.), and absorbance (I) of the elastic peak (1780 cm$^{-1}$) of a carbonyl (C=O) bond of maleic acid anhydride in a crystalline maleic acid anhydride-modified polyolefin.

Acid value (mg KOH/g-resin)=[absorbance (*I*)×(*f*)×2 ×molecular weight of potassium hydroxide× 1000 (mg)/molecular weight of maleic acid anhydride]

Molecular weight of maleic acid anhydride: 98.06
Molecular weight of potassium hydroxide: 56.11
Measurement of Melting Point The melting point is a measurement value of the maximum point representing the largest endothermic peak area (if two or more endothermic peaks were observed, a point representing the largest area from among those peaks), which was obtained by melting 1 g of the sample with heating at a rate of 20° C./min and cooled to achieve resinification, followed by melting with heating again (2nd run), using a differential scanning calorimeter (hereinafter referred to as "DSC," Q-2000, produced by TA Instruments Japan Inc.).

Measurement of Melt Viscosity

Ten grams of the sample was melted by heating (230° C.) using a single cylinder rotational viscometer (Brookfield Viscometer, type DV-I), a rotor was rotated within the molten resin, and the generated viscous resistance was read from the rotating torque to determine the viscosity (unit: mPa·s).

tester (Tester Sangyo Co., Ltd.) at a cylinder temperature of 140° C. and 0.1 MPa to obtain a laminate (polar material/adhesive layer/polypropylene resin substrate). The adhesive strength of the laminate was measured by a tensile shear test.
Tensile Shear Test (PP/AL Tensile Shear Strength)

Shear strength was measured at 5 mm/min under 25° C. atmosphere using a Tensilon (registered trademark) RTM-100, produced by Orientec Co., Ltd., in accordance with JIS K 6850 (1999) (Determination of tensile lap-shear strength of adhesives). The tensile shear strength (MPa) between the polar material and the polyolefin resin substrate was the average of three test values. Table 1 shows the results.

Evaluation Criteria
A (excellent in practice): 7 MPa or more
B (possible in practice): 5 MPa or more
C (impossible in practice): less than 5 MPa
Evaluation of Granulation The hot-melt adhesive discharged from a 15-mm-diameter twin-screw extruder (KZW15TW, produced by Technovel Corporation) was granulated with strand-cut pelletizing equipment. Table 1 shows the results.

Evaluation Criteria
AA (productivity was excellent): continuous strand-cut operation was possible for 8 hours or longer
A (production was possible): continuous strand-cut operation was possible for 4 hours or more and less than 8 hours
B (production was difficult): strand cutting was possible, but continuous operation was possible for less than 4 hours
C (production was impossible): strand cutting was impossible

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex 11 | Comp. Ex. 1 | Comp. Ex. 2 | Comp. Ex. 3 |
|---|---|---|---|---|---|---|---|---|---|---|---|---|---|---|---|
| Resin composition melting point | (° C.) | 101 | 100 | 98 | 102 | 131 | 103 | 97 | 101 | 100 | 103 | 76 | 152 | 68 | 99 |
| Acid-modified polypropylene (A) (parts by mass) | PO-A1 | 10 | 30 | 20 | 20 | | 5 | 40 | 30 | 10 | 10 | | | | 25 |
| | PO-A2 | | | | | 20 | | | | | | | | | |
| | PO-A3 | | | | | | | | | | | | 20 | | |
| | PO-A4 | | | | | | | | | | | 30 | | 55 | |
| Unfunctionalized polypropylene (B) (parts by mass) | PO-B1 | 75 | 55 | 75 | 55 | | 70 | 55 | 45 | 85 | 55 | | | | 75 |
| | PO-B2 | | | | | 65 | | | | | | | | | |
| | PO-B3 | | | | | | | | | | | | 65 | | |
| | PO-B4 | | | | | | | | | | | 60 | | 40 | |
| Polyethylene (C) (parts by mass) | PE-1 | 15 | 15 | 5 | 25 | 15 | 25 | 5 | 25 | 5 | 35 | 10 | 15 | 5 | 0 |
| PP/AL Tensile shear strength | (MPa) | 9.3 | 11.1 | 8.1 | 9.8 | 10.1 | 5.7 | 8.9 | 6.1 | 5.9 | 6.8 | 6.3 | 1.2 | 5.2 | 7.5 |
| | Evaluation | A | A | A | A | A | B | A | B | B | B | B | C | B | A |
| Granulation | Evaluation | AA | A | A | AA | AA | AA | B | A | A | AA | B | AA | C | C |

Measurement of Melt Flow Rate (MFR)

In accordance with JIS K 7210-1 (2014), the discharge weight of a resin composition melted with heating at 190° C. or 230° C. and extruded under a load of 2160 g was measured using a melt indexer produced by Toyoseiki Co., Japan, and the resulting value was converted into an amount per 10 minutes (unit: g/10 minutes).

Production of Laminate

An aluminum sheet (A1050P, Nippon Testpanel Co., Ltd., thickness×width×length=1.6×25×100 mm) was used as a polar material, and a polypropylene sheet (PP, Nippon Testpanel Co., Ltd., thickness×width×length=1.6×25×100 mm) was used as a polyolefin resin substrate.

Each of the hot-melt adhesives obtained in Examples 1 to 11 and Comparative Examples 1 to 3 was laminated onto the polar material by thermo-compression bonding to a thickness of 50 µm. Subsequently, the polyolefin resin substrate was placed on the surface of the adhesive layer and bonded by thermo-compression for 2 minutes using a heat-sealing

INDUSTRIAL APPLICABILITY

The adhesive composition and hot-melt adhesive according to the present invention has excellent adhesion to an olefin-based resin substrate and a polar material, and enables low-temperature heat sealing to be performed without damaging the olefin-based resin substrate.

The invention claimed is:
1. An adhesive composition comprising an acid-modified polypropylene (A), a propylene-butene copolymer (B), and a polyethylene (C), and having a melting point of 70 to 140° C., wherein;
   a ratio of a propylene component in the propylene-butene copolymer (B) is 50 mol % or higher,
   a melting point of the acid-modified polypropylene (A) is 65° C. or higher and 140° C. or lower,
   a melting point of the propylene-butene copolymer (B) is 70° C. or higher and 135° C. or lower, and a melting point of the polyethylene (C) is 90° C. or higher and 130° C. or lower.

2. The adhesive composition according to claim 1, comprising the propylene-butene copolymer (B) in an amount of 140 to 1500 parts by mass, and the polyethylene (C) in an amount of 10 to 600 parts by mass, per 100 parts by mass of the acid-modified polypropylene (A).

3. A hot-melt adhesive comprising the adhesive composition of claim 1.

4. A laminate of a polyolefin resin substrate and a polar material bonded with the hot-melt adhesive of claim 3.

5. A hot-melt adhesive comprising the adhesive composition of claim 2.

6. A laminate of a polyolefin resin substrate and a polar material bonded with the hot-melt adhesive of claim 5.

* * * * *